United States Patent [19]

Hanford

[11] 4,040,962

[45] Aug. 9, 1977

[54] APPARATUS FOR FEEDING CHEMICALS TO A LIQUID STREAM

[76] Inventor: William E. Hanford, 4956 Sentinel Drive, Sumner Village, Bethesda, Md. 20016

[21] Appl. No.: 662,209

[22] Filed: Feb. 27, 1976

[51] Int. Cl.² .................... C02B 3/06; C02C 1/40
[52] U.S. Cl. ......................... 210/206; 23/272.7; 137/132; 210/170
[58] Field of Search ............ 23/267 E, 267 A, 272.7, 23/272.8; 137/123, 132, 133; 210/62, 170, 205, 206, 532 S

[56] References Cited

U.S. PATENT DOCUMENTS

| | | | |
|---|---|---|---|
| 181,569 | 8/1876 | Field | 137/132 |
| 2,225,498 | 12/1940 | Hollander | 137/123 |
| 3,107,156 | 10/1963 | Fredericks | 23/267 A |
| 3,579,440 | 5/1971 | Bradley, Jr. | 23/267 E |
| 3,595,395 | 7/1971 | Lorenzen | 23/272.7 X |
| 3,615,244 | 10/1971 | Long et al. | 23/272.7 |

Primary Examiner—Wilbur L. Bascomb, Jr.
Assistant Examiner—Robert H. Spitzer
Attorney, Agent, or Firm—Martin Novack

[57] ABSTRACT

An apparatus for feeding substantially uniform amounts of a chemical into a liquid stream having an irregular flow pattern. In accordance with an embodiment of the present invention there is provided a holding tank having an inlet port for receiving a liquid stream, such as the effluent of a septic system. The tank has an aperture located at a relatively high position in a side wall thereof. A siphon means is provided and comprises an inverted U-shaped section of pipe passing through the aperture and having an inner leg which extends to a position near the bottom of the tank. The siphon means also has an outer leg which extends to a position substantially below the bottom of the tank. Chemical feeding means, preferably in the form of an erosion feeder, are coupled to the outer pipe leg of the siphon means. The feeding means contains a supply of the chemical additive and is operative to feed the chemical into the liquid discharged from the outer leg. In the preferred embodiment of the invention, undesirable dripping is minimized by coupling the outer leg to the chemical feed means via a pipe having a substantially smaller diameter than the diameter of the outer leg. In this embodiment, an erosion feeder is coupled to the outer leg by a coupling pipe and also by a relatively small diameter tubing. The erosion feeder is adapted to dissolve the chemical in the liquid which flows through the tubing and merge the resultant solution with the liquid which flows through the coupling pipe. In operation, the effluent will accumulate in the tank until a predetermined level is reached whereupon the siphon means will operate to cause a substantially uniform flow rate to the erosion feeder. In this manner, the erosion feeder can feed the chemical, typically in solid form, at a substantially uniform rate. When the tank has been discharged, the flow stops abruptly and no further chemicals are added. Thus it is seen that the system attains control of chemical feed without requiring a complex sensing or pumping system or any companion control system.

9 Claims, 1 Drawing Figure

U.S. Patent  Aug. 9, 1977  4,040,962
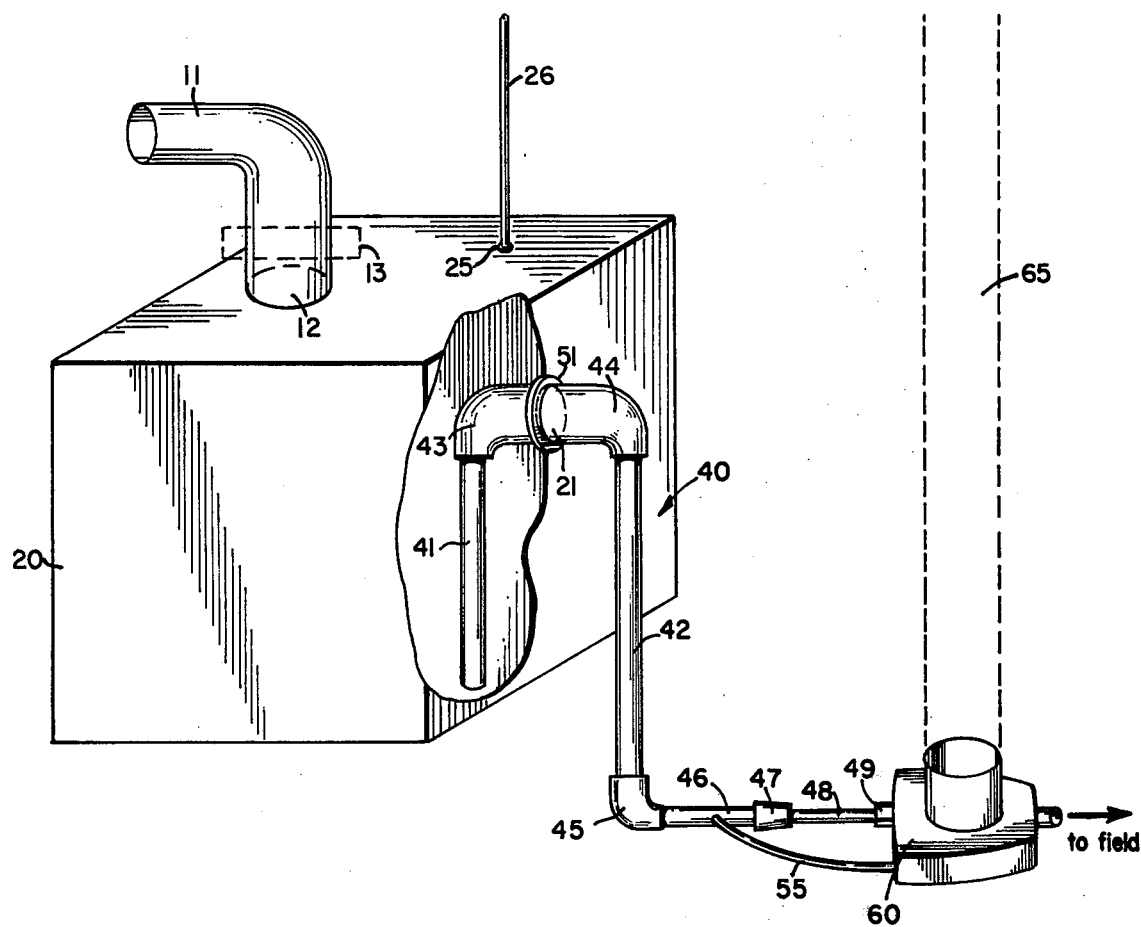

APPARATUS FOR FEEDING CHEMICALS TO A LIQUID STREAM

BACKGROUND OF THE INVENTION

This invention relates to the field of water treatment and, more particularly, to an apparatus for feeding substantially uniform amounts of a chemical into a liquid stream having an irregular flow pattern.

In the treatment of waste water there is a need for a reliable chemical feeding device that can feed substantially uniform amounts of a chemical to waste water which typically flows at an irregular rate. In many homes sewage is treated in an anaerobic septic system. The sewage enters a large tank where the solid and organic matter is decomposed by anaerobic bacteria present in the sewage. Water from the septic tank is skimmed off and generally goes into a tiled field, where the water is absorbed into the ground. The filtration which naturally occurs by the seepage of the water through the ground is in some cases sufficient to purify the water as it returns to the fresh water table. This scheme is satisfactory if the population of septic systems is kept low and there is a reasonable amount of sandy soil through which the discharged water can percolate. However, in many instances the soil is too rocky for proper filtration to occur. This results in biologically contaminated water rising to the surface or getting into the fresh water supply. In addition to considerations of bacterial contamination, instances of chemical ions, such as phosphate and nitrate ions, entering rivers and streams is becoming a significant disturbing factor in the ecological balance.

Various systems have been proposed for feeding appropriate chemicals, such as hypochlorous acid, into the effluent of the septic tank. However, the irregular flow of waste water gives rise to serious problems of regulating the concentration of chemicals added to waste water. For example, if the rate of addition of chemicals were constant, then the resulting concentration would be too low during peak periods and too high during low periods of waste water flow. Accordingly, existing systems often include complex and expensive pumps, sensing systems, and/or regulating valves which attempt to adjust the flow rate of waste water or the feed rate of chemicals. In addition to being expensive, the complexity of these systems renders them unreliable.

It is an object of this invention to provide a reliable and relatively inexpensive apparatus which is responsive to the prior art problems as set forth.

SUMMARY OF THE INVENTION

The present invention is directed to an apparatus for feeding substantially uniform amounts of a chemical into a liquid having an irregular flow pattern. In accordance with an embodiment of the present invention there is provided a holding tank having an inlet port for receiving a liquid stream, such as the effluent of a septic system. The tank has an aperture located at a relatively high position in a side wall thereof. A siphon means is provided and comprises an inverted U-shaped section of pipe passing through the aperture and having an inner leg which extends to a position near the bottom of the tank. The siphon means also has an outer leg which extends to a position substantially below the bottom of the tank. Chemical feeding means, preferably in the form of an erosion feeder, are coupled to the outer pipe leg of the siphon means. The feeding means contains a supply of the chemical additive and is operative to feed the chemical into the liquid discharged from the outer leg.

In the preferred embodiment of the invention, undesirable dripping is minimized by coupling the outer leg to the chemical feed means via a pipe having a substantially smaller diameter than the diameter of the outer leg. In this embodiment, an erosion feeder is coupled to the outer leg by a coupling pipe and also by a relatively small diameter tubing. The erosion feeder is adapted to dissolve the chemical in the liquid which flows through the tubing and merge the resultant solution with the liquid which flows through the coupling pipe.

In operation, the effluent will accumulate in the tank until a predetermined level is reached whereupon the siphon means will operate to cause a substantially uniform flow rate to the erosion feeder. In this manner, the erosion feeder can feed the chemical, typically in solid form, at a substantially uniform rate. When the tank has been discharged, the flow stops abruptly and no further chemicals are added. Thus it is seen that the system attains control of chemical feed without requiring a complex sensing or pumping system or any companion control system.

Further features and advantages of the invention will become more readily apparent from the following detailed description when taken in conjunction with the accompanying drawing.

BRIEF DESCRIPTION OF THE DRAWING

The drawing is an elevational partially cutaway view of an apparatus in accordance with an embodiment of the invention.

DESCRIPTION OF THE PREFERRED EMBODIMENT

Referring to the drawing, there is shown an apparatus in accordance with an embodiment of the invention. The discharge line 11 of the septic tank (not shown), or alternate waste water disposal equipment, is coupled, via an inlet port 12 to a holding tank 20. All of the parts shown in the drawing will typically be underground, and the distance of tank 20 below the discharge line 11 will depend upon the nature of the terrain. A suitable filter 13, shown in dashed line, may be situated on the holding tank and serves to filter out particular matter above a certain predetermined size. The tank 20 may be formed of any suitable inert material and may be rectangular, as shown, cylindrical, or any suitable shape. In the present embodiment, the tank is formed of polyethylene plastic. A vent hole 25 communicates with the surface via tube 26.

An aperture 21 is located at a relatively high position in a side wall of the tank 20. For example, in the present embodiment the tank has a base which is 2 feet square and a height of 1¼ feet, and the top of the aperture is located about 6 inches from the top of the tank. A siphon 40 comprises a U-shaped section of pipe which passes through the aperture 21. The siphon 40 has an inner leg 41 which extends to a position near the bottom of the tank, and an outer leg 42 which extends to a position substantially below the bottom of the tank. The leg 42 runs parallel to the side of the tank and perpendicular to the ground reference level. In the present embodiment the inner leg 41 is a piece of 1¼ inch pipe which extends to within about 3 inches of the bottom of the tank so as to prevent plugging by any sediment that may be accumulated in the tank, and the outer leg 42 is a piece of 1¼ inch pipe which extends to about 10 inches below the bottom of the tank. A pair of 90° elbows 43 and 44 are coupled by a nipple 51 at aperture 21, this arrangement giving the desired leak-proof U-shaped connection through the aperture 21.

At the bottom of the pipe 42 is a 90° elbow 45 and a further section 46 of 1¼ inch pipe which is substantially parallel to the ground reference level and, in the present embodiment, about 5 inches long. A reducing coupling 47 couples the end of the 1¼ inch section of pipe 46 to a section of 1 inch pipe 48 which, in the present embodiment, is 4 inches long. A flexible coupling 49 couples the 1 inch pipe 48 to a chemical feeder 60. The feeder 60 may be any suitable chemical feeding means such as the erosion feeder described in the U.S. Pat. No. 3,495,948. This type of feeder or dispenser divides an inlet fluid stream and causes a first larger portion of the inlet stream to flow through a first chamber and a second smaller portion of the inlet stream through a second chamber. An adjustably positioned chemical-containing magazine extends into the second chamber and is contacted by the second smaller portion of the inlet stream to dissolve the chemical. Typically, the chemical can be loaded in solid form, such as through the tube 65 which extends to the ground surface. The first and second portion streams are then recombined and discharged. This type of apparatus has the advantage of allowing direct control of the input of the chemical into the body of water being treated substantially independent of metering of the water introduced into the feeder to form the solution. In the present embodiment the first larger portion of the stream flows through the 1 inch pipe 48. Just before the 1¼ pipe 46 enters the reducing coupling 47, it is tapped and a relatively small diameter tubing 55 couples the second smaller stream to the erosion feeding device 60. Applicant has found that the tubing 55 should preferably be substantially perpendicular to the side of the tank and parallel to the ground reference level.

Operation of the apparatus is generally as follows: In the morning when water facilities are used to their maximum, the tank 20 will fill rather rapidly. Once the tank fills, with about 40 gallons of water in the present embodiment, the siphon will operate to discharge the water through the erosion feeder 60 at the rate of about 20 gallons per minute. In the present embodiment the tank will empty in about 2 minutes. If the rate of effluent coming into the tank is greater than 20 gallons per minute, the surge portion of the tank, i.e., the upper 6 inches, will fill and this generally provides ample capacity for any unusual water use rate encountered. During relatively inactive periods, such as the evening, the tank will simply accumulate water until the water reaches the level of the aperture 21, whereupon the siphon is automatically activated and the tank discharges. It is preferred that the outer leg 42 extend to at least 6 inches below the bottom of the inner leg 41 to achieve sufficient pressure differential for proper operation of the erosion feeding device. Also, applicant has found that the difference at the reducing coupling 47 should preferably be at least ¼ inch so as to minimize the adverse effects of dripping; i.e., collection of water in the erosion feeder 60 which can cause overconcentration. Dripping could tend to occur when the water level happens to just reach the lower edge of aperture 21 and then stops short of increasing its level sufficiently for the full free-flowing siphon action to take over. Dripping could also occur at the end of the siphon run. In addition to the present design of pipe sizes and bends, which minimize dripping, a small drain hole is provided in the bottom of erosion feeder 60. Also, it will be understood that making the tank 20 high with respect to its base area would increase the incremental fill rate and further minimize the probablity of dripping. However, a high tank is more difficult to install. The same effect could be achieved by employing a weir.

I claim:

1. Apparatus for feeding, without use of a pump, substantially uniform amounts of a chemical into a liquid stream having an irregular flow pattern, comprising:
   a holding tank having an inlet port for receiving said liquid stream, said tank having an aperture located at a relatively high position in a side wall thereof;
   siphon means comprising a section of pipe passing through said aperture with an inner leg which extends to a position near the bottom of said tank and an outer leg which extends to a position substantially below the bottom of said tank;
   chemical feeding means coupled to the outer pipe leg of said siphon means, said feeding means containing a supply of said chemical and being operative to feed said chemical into the liquid discharged from said outer leg at a rate which has dependence upon the liquid discharge rate; whereby liquid will accumulate in said holding tank without discharge until the level in said tank reaches the aperture whereupon discharge will occur at a substantially uniform rate to empty the tank to a level corresponding to about the bottom of the inner leg, the uniform discharge into said chemical feeding means providing a uniform chemical feed rate without the need for a pump.

2. An apparatus as defined by claim 1 wherein said chemical feeding means is an erosion feeder.

3. Apparatus as defined by claim 1 wherein said chemical feeding means is coupled to said outer leg by a pipe having a substantially smaller diameter than the diameter of said outer leg.

4. An apparatus as defined by claim 2 wherein said erosion feeder is coupled to said outer leg by a pipe having a substantially smaller diameter than the diameter of said outer leg.

5. Apparatus as defined by claim 2 wherein said erosion feeder is coupled to said outer leg by a coupling pipe and also by a relatively small diameter tubing, said erosion feeder being adapted to dissolve said chemical in the liquid which flows through said tubing and to merge the resultant solution with the liquid which flows through said coupling pipe.

6. Apparatus as defined by claim 4 wherein said erosion feeder is coupled to said outer leg by a coupling pipe and also by a relatively small diameter tubing, said erosion feeder being adapted to dissolve said chemical in the liquid which flows through said tubing and to merge the resultant solution with the liquid which flows through said coupling pipe.

7. Apparatus for feeding, without use of a pump, substantially uniform amounts of a chemical into a liquid stream having an irregular flow pattern, comprising:
   a holding tank for receiving said liquid stream;
   siphon means for discharging liquid from the tank at a substantially constant rate whenever the liquid in said tank reaches a predetermined level; and
   chemical feed means coupled to the discharge end of said siphon means, said feed means containing a supply of said chemical and being operative to feed said chemical, at a rate which has dependence upon the liquid discharge rate, into the liquid discharged from said siphon;

the uniform discharge into said chemical feeding means providing a uniform chemical feed rate without the need for a pump.

8. An apparatus as defined by claim 7 wherein said chemical feeding means is an erosion feeder.

9. An apparatus as defined by claim 8 wherein said erosion feeder is coupled to said siphon by a coupling pipe and also by a relatively small diameter tubing, said erosion feeder being adapted to dissolve said chemical into the liquid whch flows through said tubing and merge the resultant solution with the liquid which flows through said coupling pipe.

\* \* \* \* \*